Patented July 29, 1952

2,605,262

UNITED STATES PATENT OFFICE 2,605,262

SULFONAMIDE SALTS OF THIOSEMI-CARBAZIDE DERIVATIVES

Robert Behnisch and Fritz Mietzsch, Wuppertal-Elberfeld, and Hans Schmidt, Wuppertal-Vohwinkel, Germany, assignors to Schenley Industries, Inc., New York, N. Y., a corporation of Delaware No Drawing. Application July 25, 1949, Serial No. 106,744. In Switzerland September 16, 1948

3 Claims. (Cl. 260—239.95)

This invention relates to chemotherapeutically active salts and more particularly to salts of compounds of the sulfonamide series on the one hand, and derivatives of thiosemicarbazides on the other hand, which are active against pathogenic bacteria, in particular tubercle bacilli.

It is an object of the invention to provide compounds of valuable therapeutic and physical properties. Further objects will be apparent from the following specification.

The objects of the invention are accomplished by producing salts from an acid or basic component, one of which components should be a derivative of thiosemicarbazide, the other belonging to the same series of compounds or to the series of sulfonamides. By suitable selection of the components it is possible to prepare salts of higher or lower solubility, depending on the intended use, they can be made by reacting the components together in a suitable solvent, or by causing the soluble salts of the acid component, such as alkali- or ammonium salts, to react with the soluble salts of the basic component, such as, for instance, the hydrochlorides, nitrates or methane sulfonates in water, diluted alcohol or another suitable solvent.

Thiosemicarbazones of acid reaction are: benzaldehydethiosemicarbazone - 4 - carboxylic acid, benzaldehydethiosemicarbazone - 3 - carboxylic acid, benzaldehydethiosemicarbazone-4-acetic acid, benzaldehydethiosemicarbazone-4-acrylic acid.

Thiosemicarbazones and thiosemicarbazides of basic reaction are: 4-($\beta$-diethylaminoethyl)-ethylaminobenzaldehydethiosemicarbazone, 4 - ($\beta$ - diethylaminoethyl) - methylaminobenzaldehydethiosemicarbazone, 4 - ($\beta$ - dimethylaminoethyl) - methylaminobenzaldehydethiosemicarbazone, 4-($\beta$-dimethylaminoethyl)-ethylaminobenzaldehydethiosemicarbazone, 1-(4'-methoxybenzyl)-thiosemicarbazide, 1-(4'-ethoxybenzyl)-thiosemicarbazide and other homologues.

Sulfonamides of basic reaction are: 4-aminomethylbenzenesulfonamide, 4-aminomethylbenzenesulfonic-acid-methylamide, 4-aminomethylbenzenesulfonic-acid-ethylamide, 4-$\alpha$-aminoethylbenzenesulfonamide.

Sulfonamides of acid reaction are: 4-aminobenzenesulfonylthiourea, 4 - aminobenzenesulfonic-acid-acetylamide, 4-aminobenzenesulfonic-acid - (5' - ethylthiodiazolyl) - 2' - amide, 4 - aminobenzenesulfonic - acid - (5'-methylthiodiazolyl)-2'-amide and other homologues.

The efficacy of the combinations or salts described herein exceeds that of the components applied individually. It is possible efficiently to combat mixed or composite infections, such as are frequently found in tuberculosis. Especially pneumonia's which occur together with tuberculosis of the lungs may be mitigated or favorably influenced by the new compositions.

The invention is further illustrated by the following examples without being restricted thereto:

Example 1

A solution of 142.5 parts of 2'-(4-aminobenzenesulfonamido)-5'-ethyl-thiodiazole in 500 parts of n-caustic soda solution is reacted with a hot solution of 106 parts of 1-(4'-methoxybenzyl)-thiosemicarbazide in 1000 parts of n./2 hydrochloric acid at 80° C. with stirring. An oil which solidifies to crystals on further stirring and slowly cooling precipitates. The precipitate is sucked off and recrystallized from alcohol, whereby the salt separates in the form of colorless crystals melting at 132° C.

Example 2

A solution of 111.5 parts of benzaldehyde-thiosemicarbazone-4-carboxylic acid in 500 parts of n-ammonia is reacted at 70° C. with a solution of 111.5 parts of the hydrochloric acid salt of 4-amino-methyl-benzene-sulfonic acid amide in 500 parts of water. The salt is recrystallized and precipitates in the form of light-yellow crystals which slowly decompose on heating to a temperature above 250° C. In an analogous manner by reacting benzaldehyde-thiosemicarbazone-4-acrylic acid with 4-amino-ethyl-benzene-sulfonamide a salt is obtained in the form of faint yellow crystals which char at a temperature above 260° C.

The salt of benzaldehye-thiosemicarbazone-4-acetic acid and of 4-aminomethyl-benzene-sulfonamide forms yellow crystals and melts at 218° C.

Example 3

21 parts of 1-(4'methoxybenzyl)-thiosemicarbazide are dissolved in 200 parts of water and 100 parts of n-hydrochloric acid with boiling. This solution is reacted with a solution of 24.5 parts of the sodium salt of benzaldehyde-thiosemicarbazone-4-carboxylic acid in 250 parts of hot water. The new salt-like compound precipitates immediately in the form of a white powder, it is sucked off and washed with water. The compound does not show a sharp melting point. It chars slowly on heating from 250° C. upwards.

Example 4

A solution of 10.5 parts of 4-($\beta$-diethylaminoethyl)-ethylaminobenzaldehyde-thiosemicarbazone-hydrochloride in 100 parts of water is reacted with a solution of 7 parts of 4-aminobenzene-sulfonyl thiourea in 30 parts of n-caustic soda solution. The new compound precipitates first as a yellow resin which is extracted twice with methanol. It is dissolved in hot propylene glycol, from which the pure compound precipitates after several days' standing in the form of light-yellow crystals which are sucked off and washed with water. The compound sinters from 100° C. on and decomposes from 140° C. on. In an analogous manner a red salt melting at 171° C. is obtained from 4-dimethylamino-benzaldehyde-thiosemicarbazone- and 4-aminobenzenesulfonylthiourea.

We claim:

1. A chemotherapeutically active acid reacting sulfonamide salt of a basic reacting thiosemicarbazide wherein the sulfonamide moiety is selected from the group consisting of 4-aminobenzenesulfonylthiourea and 4-aminobenzene sulfonic acid-(5'-alkyl-thiodiazolyl)-2'-amide, and the thiosemicarbazide moiety is selected from the group consisting of (dialkylaminoalkyl)-alkylamino-benzaldehydethiosemicarbazones and alkoxybenzylthiosemicarbazides.

2. A chemotherapeutically active salt, the 2'-(4-amino-benzenesulfonamido)-5'-ethylthiodiazolate of 1-(4'-methoxybenzyl)-thiosemicarbazide.

3. A chemotherapeutically active 4-aminobenzenesulfonylthiourea salt of 4-(beta-diethylaminoethyl)-ethylaminobenzaldehyde-thiosemicarbazone.

ROBERT BEHNISCH.
FRITZ MIETZSCH.
HANS SCHMIDT.

REFERENCES CITED

The following references are of record in the file of this patent:

UNITED STATES PATENTS

| Number | Name | Date |
| --- | --- | --- |
| 2,268,324 | Palgar | Dec. 30, 1941 |
| 2,336,907 | Winnek | Dec. 14, 1943 |
| 2,358,031 | Roblin | Sept. 12, 1944 |
| 2,389,582 | Winnik et al. | Nov. 20, 1945 |
| 2,420,434 | Kyrides et al. | May 13, 1947 |
| 2,450,406 | Bambas | Oct. 5, 1948 |

FOREIGN PATENTS

| Number | Country | Date |
| --- | --- | --- |
| 231,024 | Switzerland | May 1, 1944 |

OTHER REFERENCES

Freund: Ber. der Deu. Chem., vol. 29 (1896), pp. 2513–2515. (Complete article pp. 2511–2517).

Behnisch et al., "Angewandte Chemie," vol. 60, May 1948, p. 114.